Patented June 9, 1942

2,285,501

UNITED STATES PATENT OFFICE 2,285,501

MANUFACTURE OF MOLDING COMPOUNDS

Alfred L. Dixon, Western Springs, and Raymond P. Lutz, Oak Park, Ill., assignors to Western Electric Company, Incorporated, New York, N. Y., a corporation of New York No Drawing. Application February 28, 1940, Serial No. 321,206

4 Claims. (Cl. 260—10)

This invention relates to methods for preparing molding compounds, and more particularly to methods for incorporating fibrous filling materials in molding compounds of the thermosetting type.

One familiar type of thermosetting molding compound comprises a suitable resin, such as a phenol-aldehyde resin, and filling materials, the resin serving as a binder for the filling materials in the subsequent molding operation. These phenol plastic molding compounds are used in the manufacture of various molded products and they have been prepared by combining the resin and fillers on compounding rolls, or in an internal mixing apparatus, such as the Banbury mixer which subjects the ingredients to a smearing or kneading action.

Certain characteristics of these compounds, and the associated properties of the articles molded therefrom, can be regulated by proper selection of the fillers incorporated in the compound. In many molded articles, impact strength is an important consideration and this property can be affected by the use of wood flour or fibrous materials in the compound. Fibrous materials are proportionately more effective than wood flour in increasing the impact strength of the molded article. The addition of wood flour to the compound effects little change in impact strength until a fairly large quantity, somewhere around 30% of the total compound weight, is present; whereas the addition of relatively smaller quantities of a suitable fibrous material will increase the impact strength of the molded article appreciably and in many cases the substitution of fibrous materials for wood flour in the compound results in a sharp increase in the impact strength of articles molded therefrom.

Consequently, it is often desirable to use fibrous materials in these compounds. One fibrous material that is generally available and relatively cheap is cotton flock, but it has been difficult to incorporate cotton flock in these compounds properly by prior compounding methods. Due to compounding process limitations, it has been necessary to restrict the permissible cotton flock content, particularly in compounds used for articles having special appearance requirements. For example, molded articles used for the exposed portions of telephone subscriber apparatus require a smooth, glossy and uniform finish throughout their service life. The impact strength of these articles is also important, because they receive considerable handling, but appearance is a primary requirement. Articles molded from compounds prepared by prior methods tend to develop finish defects whenever the cotton flock content of the compound is relatively high. These defects occur as orange peel or pimples on the article surface and in some cases these blemishes do not appear until the article is subjected to handling and exposure to atmospheric moisture during a period of service. As a result, it has been necessary to restrict the cotton flock content, usually to less than 20% of the compound weight, in compounds used for this type of article, at a sacrifice of the strength available with higher proportions of flock or similar fibrous materials.

An object of this invention is the provision of improved methods for making molding compounds containing a high proportion of fibrous material for the production of molded articles having high impact strength values and a smooth and durable finish.

One embodiment of this invention provides a molding compound of the phenol plastic type which contains as much as 50% by weight of cotton flock and is suitable for the manufacture of molded articles having substantial mechanical strength and a high quality finish appearance. In the compounding process a phenol-aldehyde resin in finely divided form, the cotton flock, and other ingredients as desired, such as pigments or wood flour, are first mixed together by stirring. The mixture is then fed into a chamber containing rapidly moving members which disperse and sharply impact the mixture ingredients and project them through an adjacent screen. The mixture is next kneaded for a definite period, cooled under pressure to densify the mass and arrest the resin cure, and finally pulverized into particles of a specified size. Due to the high cotton flock content, the distribution of the fibres and condition of the resin accomplished by the compounding method, articles molded from this compound exhibit oustanding mechanical strength and present a smooth and glossy finish which preserves its appearance throughout a long service life.

One type of resin suitable for use in the manufacture of this compound is a one-step phenol formaldehyde resin to which a small amount of accelerators, such as hydrated lime, and a lubricant, such as calcium stearate, may be added. The resin is pulverized into sufficiently fine particles to pass through a 150 mesh screen.

All of the compound ingredients, including the resin, cotton flock, other fillers, and pigment are first combined by gentle mixing. This preliminary mixing can be accomplished by manual or mechanical stirring or by tumbling. In this operation any heating of the resin should be avoided and the resin maintained in the form of hard, dry particles. The gentle stirring or tumbling is continued until the resin, pigment and any readily separable fillers, such as wood flour, are well dispersed throughout the mass. The cotton flock, which may be equal to 50% of the compound weight, is added in the form of tenacious and matted clumps, in which it is available commercially, and during the preliminary mixing these clumps become distributed throughout the mass.

The mixture is then subjected to a secondary compounding operation which may be performed conveniently in a hammer mill. This mill comprises a horizontal cylindrical chamber with its peripheral surface formed by a screen. The rear face or wall of the cylinder supports a rotatable shaft which is driven by a motor at the rear of the cylinder. Projecting from the shaft inside the chamber are a series of uniformly spaced and slender radial arms and on the end of each arm, adjacent to the screen, is mounted a ball or hammer. The shaft is driven at high speed, around 10,000 R. P. M., causing the arms and hammers to rotate at a high velocity within the chamber. At the center of the front chamber wall, aligned with the shaft, is an opening through which the mixture of resin and filler is fed to the chamber by means of a screw feed. As the mixture ingredients enter the chamber they are immediately engaged by air currents set up by the whirling hammers and carried rapidly in dispersed arrangements towards the screen. As the ingredients are carried through the chamber by the air currents they are impacted by the whirling hammers and arms. This action breaks up the clumps of cotton flock into individual fibres and also further pulverizes the resin particles, without appreciably heating or plasticizing the particles, and coats or dusts them in dry form on the fibres. As stated above, when a hammer mill is used for this purpose, the impacting hammers are operated at high speed, around 10,000 R. P. M. to accomplish this result, and the term "high speed" as used in the claims denotes a velocity of sufficiently high order to produce the air currents and impacting action necessary to pulverize the resin, break up the flock clumps into individual fibres and coat the pulverized resin in dry form on the individual fibres.

In the next operation the mixture is kneaded in a suitable apparatus, such as the Banbury mixer. This apparatus comprises a walled chamber with moving blades therein which smear the chamber contents between the blades and against the chamber wall. During this operation substantial frictional heat is generated within the mass, which plasticizes the resin. This plasticizing action is controlled to consolidate the resin coating on the fibres without unduly advancing the resin cure. The temperature is controlled by circulating water within the walls of the mixer and by close regulation of the working period. A kneading period of about two minutes, during which the mixture reaches a dough state, is generally adequate.

A doughy mass is removed from the mixer as soon as the kneading is completed and immediately densified and cooled rapidly to arrest cure of the resin by rapidly withdrawing heat therefrom. This can be done by pressing the mass between cold platens of a hydraulic press, or rolls.

After the material has been cooled, it is crushed and pulverized until about 80% of the material will pass through a 16 mesh screen. The resultant compound is suitable for molding into articles in hot dies by the usual process employed with thermosetting compounds.

The resultant articles are mechanically strong and also have a smooth and durable finish due to their high cotton flock content, the manner in which the cotton is incorporated in the compound, and the condition of the resin at the start of the molding operation. The compounding process accomplishes an effective distribution and bonding of the cotton fibres without degradation of the fibres which preserves the individual size, configuration and strength of the fibres. The configurations of the fibres in the commercial flock are adapted to high strength development in the article and these configurations are not substantially modified during the preparation of the compound. During the compounding process pre-curing of the resin is minimized with the result that most of the curing action occurs during the molding operation with a proportionate contribution to article strength.

Although a specific embodiment of the invention is above described in detail, it will be apparent that modifications thereof are feasible. The described compounding process can be used for preparing compounds with other thermosetting resins than phenolic base resins, and with fibrous filling materials other than cotton flock. It is, therefore, to be understood that the invention is restricted only by the scope of the appended claims.

What is claimed is:

1. In a method of making a molding compound, the steps of stirring together cotton flock and a finely divided phenolic base resin to form an unbonded mixture of flock and hard resin particles, subjecting the resultant mixture to the action of air currents to disperse the cotton flock in the form of clumps, impacting at high speed the dispersed clumps to release individual cotton fibres from the clumps and dust the hard resin on the fibres, then kneading the mixture until it forms into a doughly mass, rapidly cooling the doughy mass, and pulverizing the cooled mass to form a molding compound.

2. In a method of making a molding compound, the steps of stirring together a quantity of cotton flock equal to at least 50% of the total compound weight and a phenol aldehyde resin without causing any substantial heating of the resin, subjecting the resultant mixture to the action of air currents to disperse the cotton flock in the form of clumps admixed with the resin, impacting at high speed the dispersed clumps and resin to release individual cotton fibres from the clumps and dust resin on the fibres, then kneading the mixture until it forms into a doughy mass, rapidly cooling the doughy mass, and pulverizing the cooled mass to form a molding compound.

3. In a method of making a molding compound, the steps of stirring together cotton flock and a phenolic base resin in the form of small particles, said stirring being conducted in a manner to avoid heating of the resin particles, subjecting the resultant mixture to the action of air currents to disperse the cotton flock admixed with the resin in the form of clumps, impacting at high speed the dispersed ingredients to release individual cotton fibres from the clumps and dust resin in the form of small hard particles on the fibres, then kneading the mixture until the resin is consolidated on the fibres due to plasticizing of the resin caused by frictional heat developed during the kneading, rapidly cooling the resultant mass to arrest cure of the resin, and pulverizing the cooled mass to form a molding compound.

4. In a method of making a molding compound, the steps of stirring together a phenolic resin in the form of small particles and a quantity of cotton flock equal to at least 50% of the total compound weight, said stirring being conducted without heating of the resin and being continued only until the flock is distributed in the resin mass in the form of clumps, subjecting the resultant mixture to the action of air currents to disperse the admixed resin and cotton flock clumps, impacting at high speed the dispersed resin and clumps to release individual cotton fibres from the clumps and dust small and hard particles of resin on the fibres, then kneading the mixture until the resin particles are plasticized by the frictional heat developed by the kneading action to form a consolidated coating on the fibres, rapidly cooling the resultant mass to arrest curing of the resin, and pulverizing the cooled mass until a major portion of the mass passes a 16 mesh screen to form a molding compound.

ALFRED L. DIXON.
RAYMOND P. LUTZ.